US009857926B2

(12) United States Patent
Yun et al.

(10) Patent No.: US 9,857,926 B2
(45) Date of Patent: Jan. 2, 2018

(54) MATRIX SWITCHING TYPE TOUCH PANEL COMPRISING UNIT ELECTRODES CONNECTED BY BRIDGES

(71) Applicant: Hydis Technologies Co., Ltd., Icheon-si, Gyeonggi-do (KR)

(72) Inventors: Seong Jung Yun, Hwaseong-si (KR); Ji Hoon Lee, Seoul (KR); Hyung Jung Kim, Seongnam-si (KR); Gil Taek Lim, Icheon-si (KR); Dae Lim Choi, Yongin-si (KR); Yoon Jin Jo, Busan (KR)

(73) Assignee: Hydis Technologies Co., Ltd., Icheon-si (KR)

( * ) Notice: Subject to any disclaimer, the term of this patent is extended or adjusted under 35 U.S.C. 154(b) by 91 days.

(21) Appl. No.: 14/587,038

(22) Filed: Dec. 31, 2014

(65) Prior Publication Data
US 2015/0242016 A1    Aug. 27, 2015

(30) Foreign Application Priority Data
Feb. 26, 2014   (KR) ........................ 10-2014-0022502

(51) Int. Cl.
*G06F 3/044*    (2006.01)
(52) U.S. Cl.
CPC .... *G06F 3/044* (2013.01); *G06F 2203/04112* (2013.01)
(58) Field of Classification Search
CPC ........... G06F 3/044; G06F 2203/04112; G06F 2203/04111

USPC ......................................................... 345/174
See application file for complete search history.

(56) References Cited

U.S. PATENT DOCUMENTS

| 2010/0050784 | A1* | 3/2010 | Joung, II | G01L 5/228 73/862.046 |
|---|---|---|---|---|
| 2012/0050209 | A1* | 3/2012 | King | G06F 3/0416 345/174 |
| 2012/0153970 | A1 | 6/2012 | Mignard et al. | |
| 2013/0127769 | A1* | 5/2013 | Guard | G06F 3/044 345/174 |
| 2013/0335376 | A1* | 12/2013 | Lee | G06F 3/0416 345/174 |

(Continued)

FOREIGN PATENT DOCUMENTS

TW    200643778 A    12/2006
TW    M447541 U    2/2013

*Primary Examiner* — Lisa Landis
(74) *Attorney, Agent, or Firm* — Dority & Manning, P.a.

(57) ABSTRACT

Provided is a matrix switching type touch panel including a plurality of touch pads disposed in a visible area on a substrate in a dot matrix format, the touch pads spaced from one another, and a plurality of signal lines disposed in a space between the touch pads, each connecting a touch pad and a touch driving circuit of an invisible area. The panel comprises: unit electrodes made of a transparent electroconductive material and disposed within the visible area; touch pad areas each determined in an area corresponding to each touch pad; signal line areas each determined in an area corresponding to each signal line; and bridges electrically connecting the plurality of unit electrodes disposed in each touch pad area and each signal line area. The unit electrodes are arranged in a zigzag format with respect to a first axis parallel to the signal lines.

11 Claims, 10 Drawing Sheets

(56) References Cited

U.S. PATENT DOCUMENTS

2014/0375903 A1\* 12/2014 Westhues ............... G06F 3/044
                                                    349/12

\* cited by examiner

Prior Art

Prior Art

Prior Art

MATRIX SWITCHING TYPE TOUCH PANEL COMPRISING UNIT ELECTRODES CONNECTED BY BRIDGES

CROSS-REFERENCE TO RELATED APPLICATIONS

This application claims the benefit of priority under 35 U.S.C. §119(a) of Korean Patent Application No. 10-2014-0022502 filed on Feb. 26, 2014, in the Korean Intellectual Property Office, the entire disclosure of which is incorporated herein by reference for all purposes.

BACKGROUND

1. Field

The following description relates to a matrix switching type touch panel, and more specifically, to a matrix switching type touch panel capable of preventing the boundaries between areas where a transparent electrode exists and areas where a transparent electrode does not exist from becoming visually distinguishable, while preventing the transparent electrodes of the touch panel from causing the Moire effect.

2. Description of Related Art

In general, a matrix switching type touch panel comprises a plurality of touch pads disposed in a visible area on a substrate in a dot matrix format, the touch pads spaced from one another; and a plurality of signal lines disposed in the space between the touch pads, each signal line connecting a touch pad and a touch driving circuit of a invisible area.

As illustrated in FIG. 1, in a conventional matrix switching type touch panel, transparent electrodes are patterned on a substrate 10, forming touch pads 20 and signal lines 30, and thus a visible area A1 may be divided into an area where transparent electrodes exist and the remaining area where transparent electrodes do not exist. Herein, due to difference of penetration ratio, reflectance, and color etc. between an area where transparent electrodes exist and an area where transparent electrodes do not exist, there is a problem of a patterning mark occurring, that is the area where transparent electrodes exist becoming visible.

In such touch screen panels, a coating layer is provided in order to resolve the visual difference between the area where transparent electrodes exist and the area where transparent electrodes do not exist. However, adding a coating layer increases the cost and complicates process, and further, even if a coating layer is added, in a matrix switching type touch panel, numerous signal lines 30 are disposed in a straight line format in a visible area A1 on a substrate 10, and thus may become easily visible.

Furthermore, in the signal lines 30 that connect touch pads 20 and a touch driving circuit 40, if the distance between the touch driving circuit 30 and the touch pads 20 are far apart, the resistance and parasitic capacitance increase as the wire length of the signal lines 30 gets longer. Therefore, the signal lines 30 are designed to have greater width as the wire length gets longer as in FIG. 2. However, this may cause a structural problem since the boundaries between the signal lines 30 in some areas are disposed densely thereby increasing the visibility.

Furthermore, if the line of the signal electrode of the touch pad corresponds to the line of the pixel electrode of the liquid crystal panel, the pattern of two parallel lines spaced by a certain distance will overlap each other as in FIG. 3, thereby causing an optical defect. That is, the screen quality will be deteriorated by the Moire effect of displaying a line pattern having a predetermined distance D.

SUMMARY

Therefore, the purpose of the present disclosure is to resolve the aforementioned problems of prior art, that is to provide a matrix switching type touch panel that is capable of preventing an area of transparent electrodes from being visually distinguishable from an area where there is no transparent electrode while also preventing the transparent electrodes of the touch panel from causing the Moire effect.

Furthermore, another purpose of the present disclosure is to provide a matrix switching type touch panel that may prevent the up-down and left-right boundaries between unit electrodes from becoming visible.

The aforementioned purposes are achieved by a matrix switching type touch panel according to the present disclosure.

In one general aspect, there is provided a matrix switching type touch panel including a plurality of touch pads disposed in a visible area on a substrate in a dot matrix format, the touch pads spaced from one another, and a plurality of signal lines disposed in a space between the touch pads, each signal line connecting a touch pad and a touch driving circuit of a invisible area, wherein the matrix switching type touch panel comprises: unit electrodes made of a transparent electroconductive material and disposed within a visible area on the substrate; touch pad areas each determined in an area corresponding to each touch pad; signal line areas each determined in an area corresponding to each signal line; and bridges electrically connecting the plurality of unit electrodes disposed in each touch pad area and each signal line area, configuring touch pads and signal lines, wherein the unit electrodes are arranged in a zigzag format with respect to a first axis parallel to the signal lines.

In addition, each of the plurality of unit electrodes may be arranged such that a first straight line section that is slantly disposed in a first direction with respect to a first axis and a second straight line section that is slantly disposed in a second direction symmetrical to the first straight line section based on the first axis are alternately repeated.

In addition, the first direction and second direction may be set to be between 10 to 20 degrees to both sides with respect to the first axis.

In addition, the bridge may be formed on a same layer as the unit electrodes.

In addition, the unit electrodes may be provided with a plurality of protrusions at both sides, and the plurality of protrusions may be disposed alternately to the protrusions of neighboring unit electrodes.

In addition, the bridges connecting the unit electrodes in a direction crossing the signal lines may be extended from at least one protrusion of among the plurality of protrusions provided at a pair of neighboring unit electrodes.

In addition, the bridges may be disposed alternately to neighboring bridges along a direction crossing the signal lines.

In addition, end portions of the unit electrodes may be disposed alternately to end portions of neighboring unit electrodes along a direction crossing the signal lines.

In addition, the signal lines may comprise at least two unit signal lines aligned in rows so as to reduce the resistance along the wire length between the touch panels and touch driving circuit.

In addition, the two or more unit signal lines may be electrically connected to each other as the connecting lines connecting each unit signal line with the touch driving circuit within the invisible area are connected to each other.

In addition, the two or more unit signal lines may be electrically connected to each other by a plurality of bridges within the visible area.

According to the aforementioned embodiments of the present disclosure, there is provided a matrix switching type touch panel that is capable of preventing the boundaries between areas where a transparent electrode exists and areas where a transparent electrode does not exist from becoming visible, while preventing the transparent electrodes of the touch panel from causing the Moire effect.

Furthermore, according to the aforementioned embodiments of the present disclosure, there is provided a matrix switching type touch panel that is capable of preventing the boundaries of up-down, and left-right directions between electrodes from becoming visually distinguishable.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity, illustrating, and convenience.

DETAILED DESCRIPTION

Figure 1:
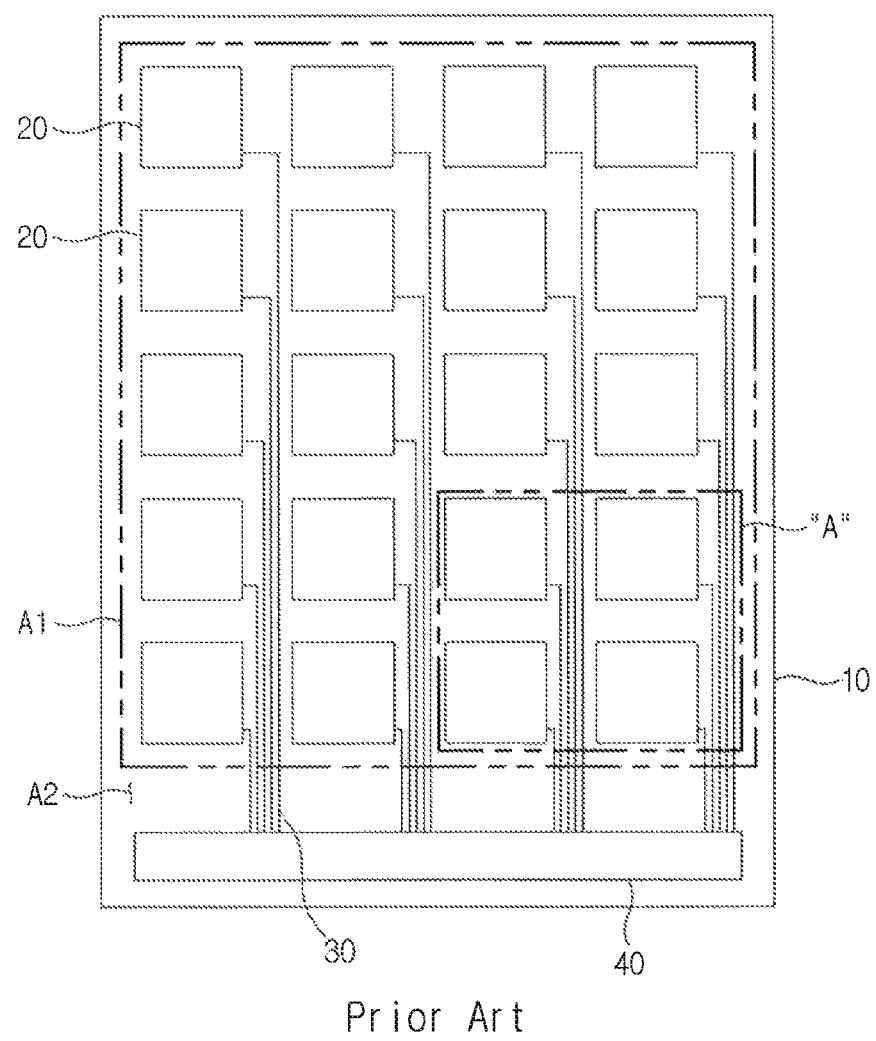
FIG. 1 is a schematic plane view of a conventional matrix switching type touch panel.
Figure 2:
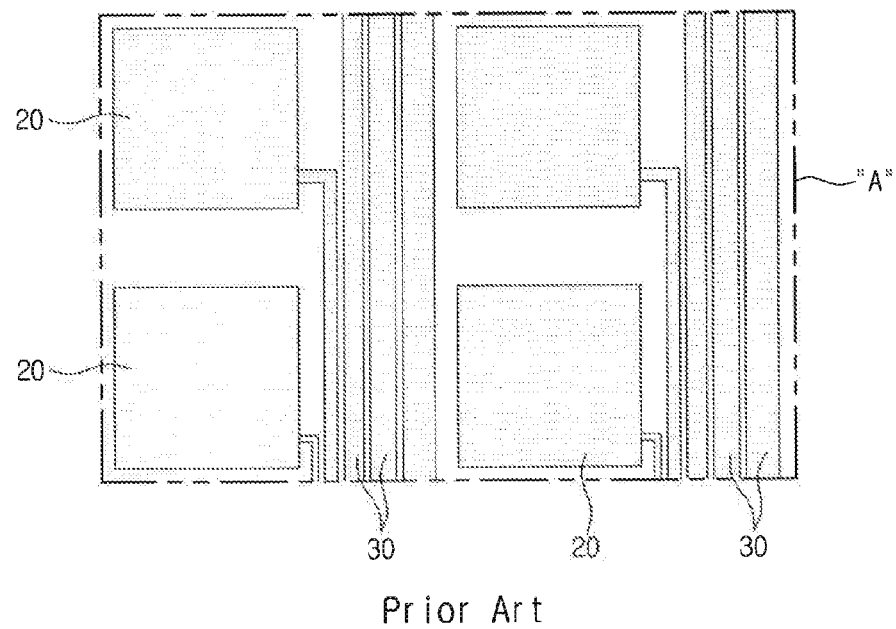
FIG. 2 is an exploded view of "A" portion of FIG. 1.
Figure 3:
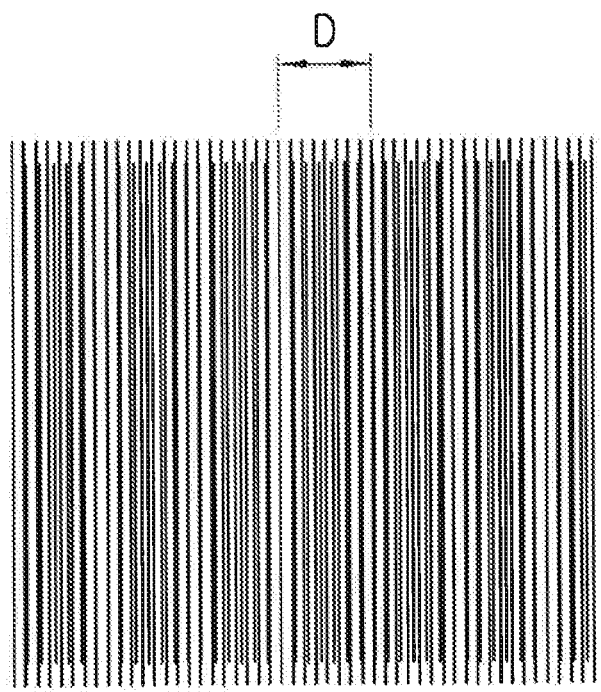
FIG. 3 is a view illustrating the Moire effect.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Configurative elements of the same configuration will be explained representatively in a first embodiment only using the same reference numerals, while in other embodiments, only configurations different from those of the first embodiment will be explained. Hereinbelow is explanation on a matrix switching type touch panel according to a first embodiment of the present disclosure with reference to the attached drawings.

Figure 4:
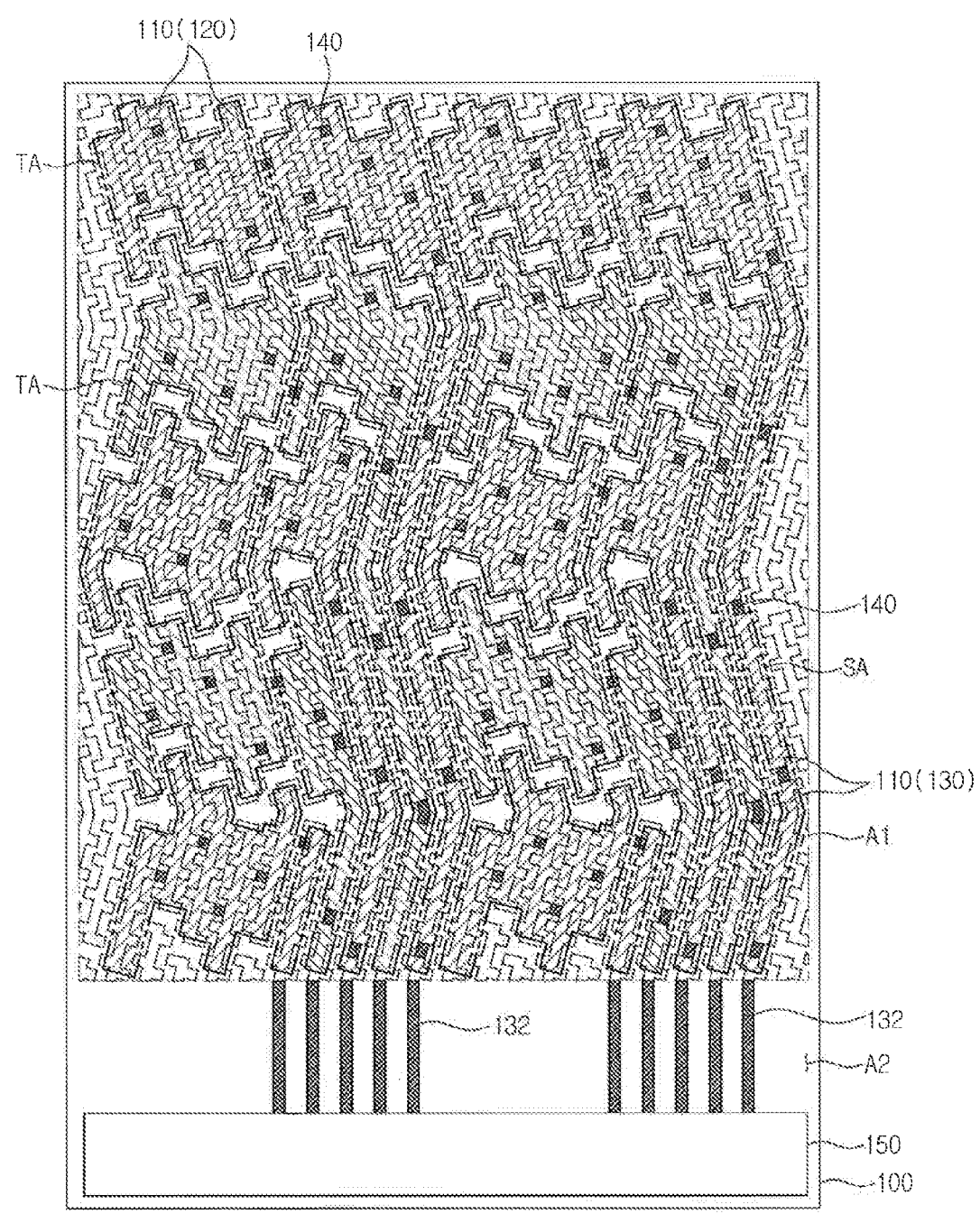
FIG. 4 is a view of a configuration of a matrix switching type touch panel according to an embodiment of the present invention.
Figure 5:
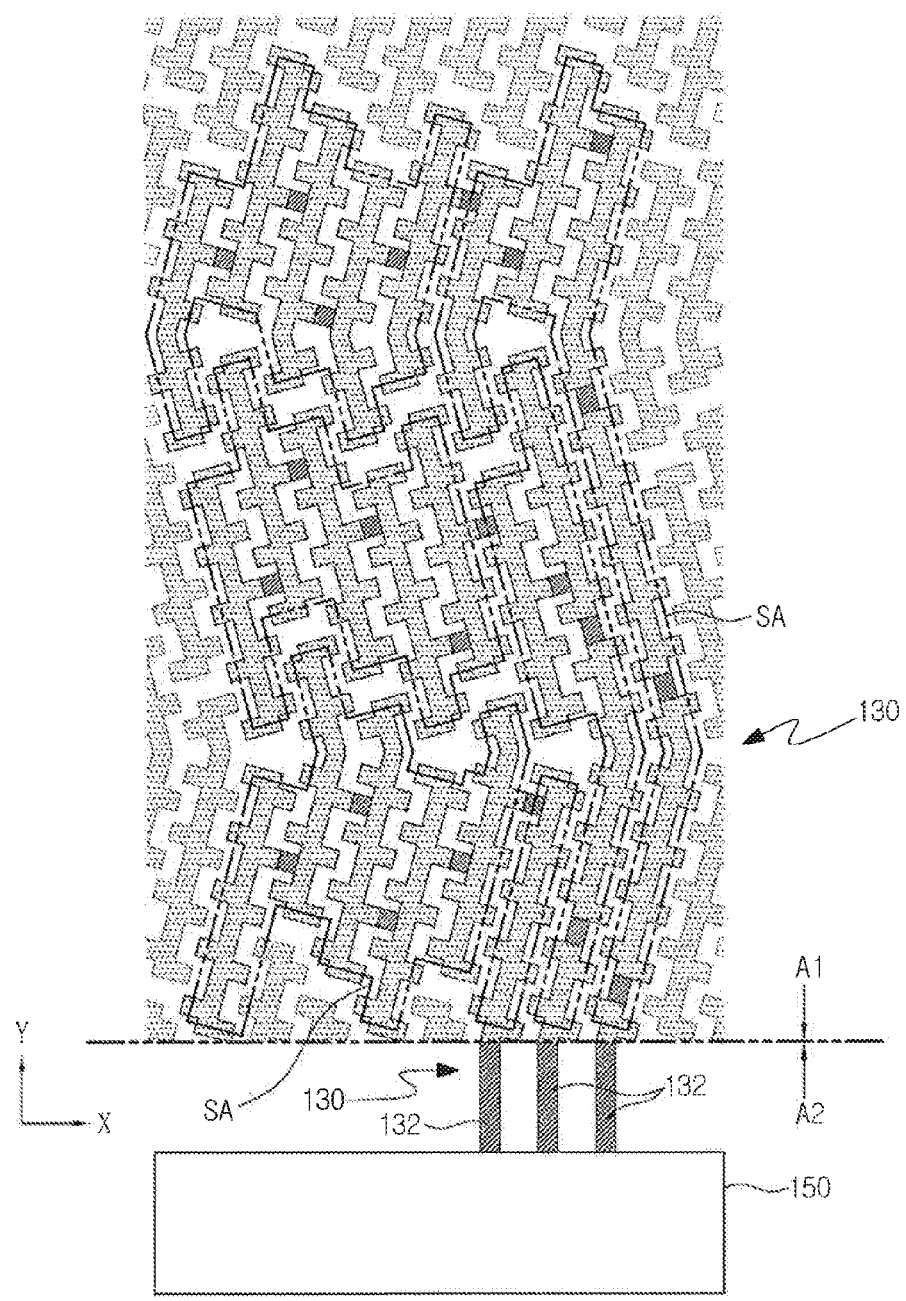
FIG. 5 is an exploded view of a main portion of FIG. 4.

FIG. 4 is a plane view of a matrix switching type touch panel according to an embodiment of the present disclosure, and FIG. 5 is an exploded view of a main portion of FIG. 4.

As illustrated in the aforementioned figures, the first embodiment of the present disclosure relates to a matrix switching type touch panel comprising touch pads 120 disposed in a visible area A1 on a substrate 100 in a dot matrix format, the touch pads being spaced from one another, and signal lines 130 disposed in the space between the touch pads 120 and connecting the touch pads 120 with a touch driving circuit 150 of an invisible area A2.

Such a matrix switching type touch panel according to the first embodiment of the present disclosure comprises unit electrodes 110 made of a transparent electroconductive material and disposed in a visible area A1 on a substrate, a touch pad area TA defined as an area corresponding to the touch pads 120 in the visible area A1, signal line area SA defined as an area corresponding to the signal lines 130, and bridges 140 electrically connecting a plurality of unit electrodes 110 disposed in the touch pad area TA and signal line area SA, configuring the touch pads 120 and signal lines 130.

Each of the plurality of unit electrodes 110 is made of transparent electrode material having a rectangular shape, and the unit electrodes 110 are arranged in a zigzag format with respect to a first axis (shown as Y axis in FIG. 5) that is parallel to a signal line.

That is, each of the plurality of unit electrodes 110 is arranged such that a first straight line section that is slantly disposed in a first direction with respect to a first axis (Y) and a second straight line section that is slantly disposed in a second direction symmetrical to the first straight line section based on the first axis(Y) are repeated alternately, and the first direction and second direction are set to be between 10 to 20 degrees to both sides with respect to the first axis (Y). Herein, when the slant angle is set to be between 0~9 degrees, the distance of the Moire pattern would be 150 μm or more, and thus the Moire pattern would be visually distinguishable. Furthermore, when the first direction and second direction are set to be above 20 degrees with respect to the first axis (Y), the untouchable area between the unit electrodes which are arranged in a zigzag format and the edge of the visible area A1 will become bigger. Herein, the untouchable area refers to an area where the plurality of the unit electrodes 110 are not included in the touch pad area (TA) and the signal line area (SA) and thus a touch cannot be recognized as a touch.

On both sides of each of the plurality of unit electrodes 110, a plurality of protrusions 112 are disposed, the protrusions spaced from one another. The protrusions 110 formed on a surface of one of a pair of unit electrodes 110 neighboring each other along the second axis (shown as X axis in FIG. 5) direction perpendicular to the connecting line 132 are disposed alternately to the protrusions 112 of its neighboring unit electrode 110, and a shorter side of an exterior side of each unit electrode 110 is disposed alternately to a shorter side of its neighboring unit electrode 110 along the second axis (X) direction that is perpendicular to the signal line 130.

The bridges 140 are made of the same transparent electroconductive material as the unit electrodes 110 in the process of forming the unit electrodes 110 together with the unit electrodes 110, and are thus disposed on the same layer as the unit electrodes 110. Such a bridge 140 is extended from at least one protrusion 112 of among a plurality of protrusions 112 provided at a pair of neighboring unit electrodes 110 and is connected to the neighboring electrode 110 along the second axis (X) direction. Furthermore, the bridges 140 are disposed alternately to their neighboring bridges 140 regarding the second axis (X) direction crossing the signal lines 130.

Meanwhile, according to a first embodiment of a matrix switching type touch panel of the present invention, since each of the plurality of unit electrodes 110 is slantly disposed with respect to the first axis (Y) and crosses the diffusion pattern that is laminated with the touch panel and the pattern of the TFT array panel by a predetermined angle, thereby preventing the Moire effect.

Furthermore, since each of the plurality of unit electrodes 110 is arranged such that a first straight line section that is slantly disposed in a first direction and a second straight line section that is slantly disposed in a second direction are repeated alternately, the untouchable area that may occur along the edge of the visible area A1 may be minimized.

Furthermore, the unit electrodes 110 having the same shape are arranged in the visible area A1 of the substrate in a horizontal and vertical direction, but such that the end portion corresponding to the shorter sides of the unit electrodes is disposed alternately to the end portions of their neighboring unit electrodes 110 regarding the second axis (X) direction that crosses the signal lines 130.

According to such an arrangement structure, it is possible to prevent a patterning mark from occurring due to difference of penetration ratio, reflectance, and color etc. between an area where unit electrodes exist and an area where unit electrodes do not exist, that is, to prevent an area of transparent electrodes from being visually distinguishable from an area where there is no transparent electrodes.

Furthermore, at such a rectangular unit electrode 110, a plurality of protrusions 112 are formed at the side portion corresponding to a longer side of the unit electrode 110 with respect to the first axis (Y) direction parallel to the signal line 30, thereby preventing a side portion boundary line corresponding to the longer side of the unit electrode 110 from being visible.

In addition, as the protrusions 112 of the unit electrodes 110 neighboring one another in the second axis (X) direction are disposed alternately to one another in the space in the left and right side of the unit electrodes 110, the left and right space between the unit electrodes 110 are prevented from being visually distinguishable.

Moreover, as the first axis (Y) direction end portions of the unit electrodes 110 are disposed alternately to the second axis (X) direction end portions of the neighboring unit electrodes, the upper and lower space between the unit electrodes 110 are prevented from being visually distinguishable.

That is, according to such an arrangement structure of the unit electrodes 110, it is possible to prevent an area where unit electrodes are formed from being visually distinguishable from an area where there is no unit electrodes, and prevent the space between the unit electrodes 110 from being disposed in straight lines in the second axis (X), the first axis (Y) direction, thereby preventing not only the unit electrodes 110 but also the space between the unit electrodes 110 from becoming visually distinguishable in the visible area A1.

Meanwhile, hereinbelow is explanation on a process of forming touch pads 120 and signal lines 130 from an arrangement structure of unit electrodes 110 according to a first embodiment of the present disclosure mentioned above with reference to the drawings.

Figure 6:
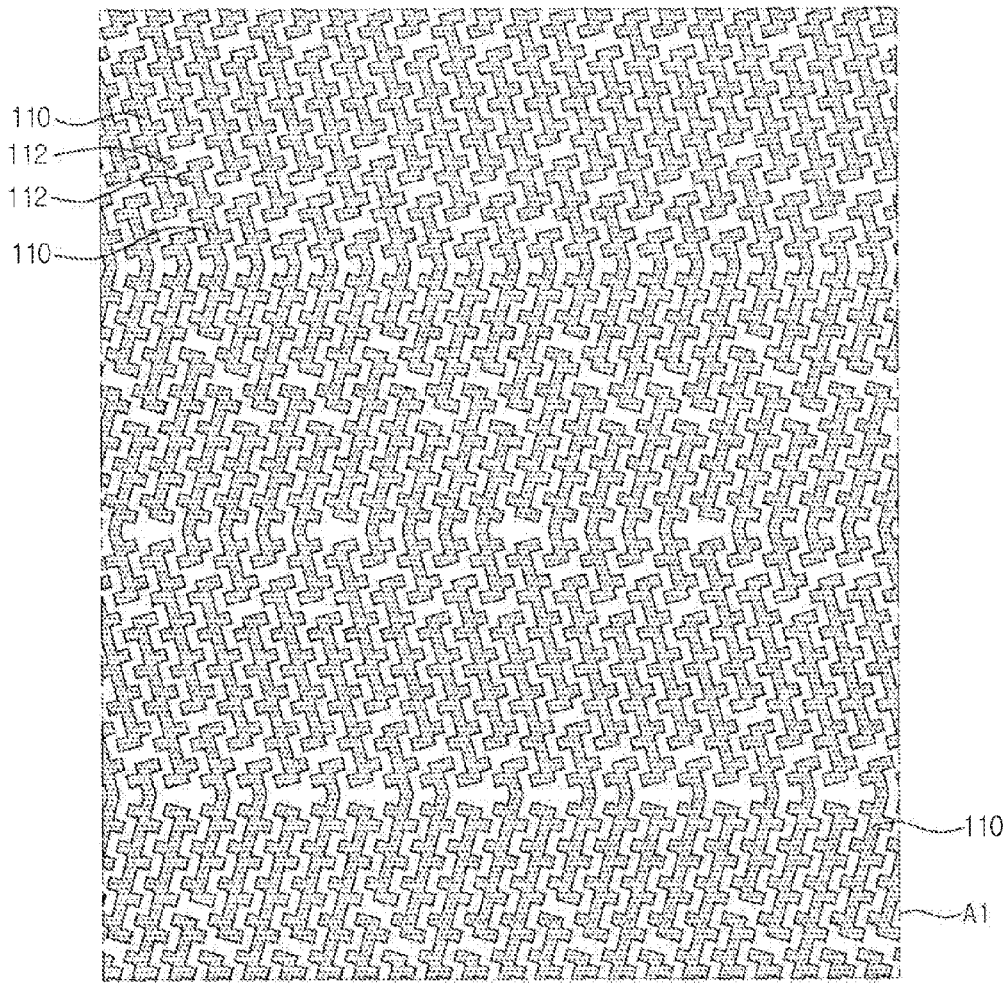
FIGS. 6 to 8 are views illustrating a process of forming a matrix switching type touch panel according to an embodiment of the present disclosure.
Figure 7:
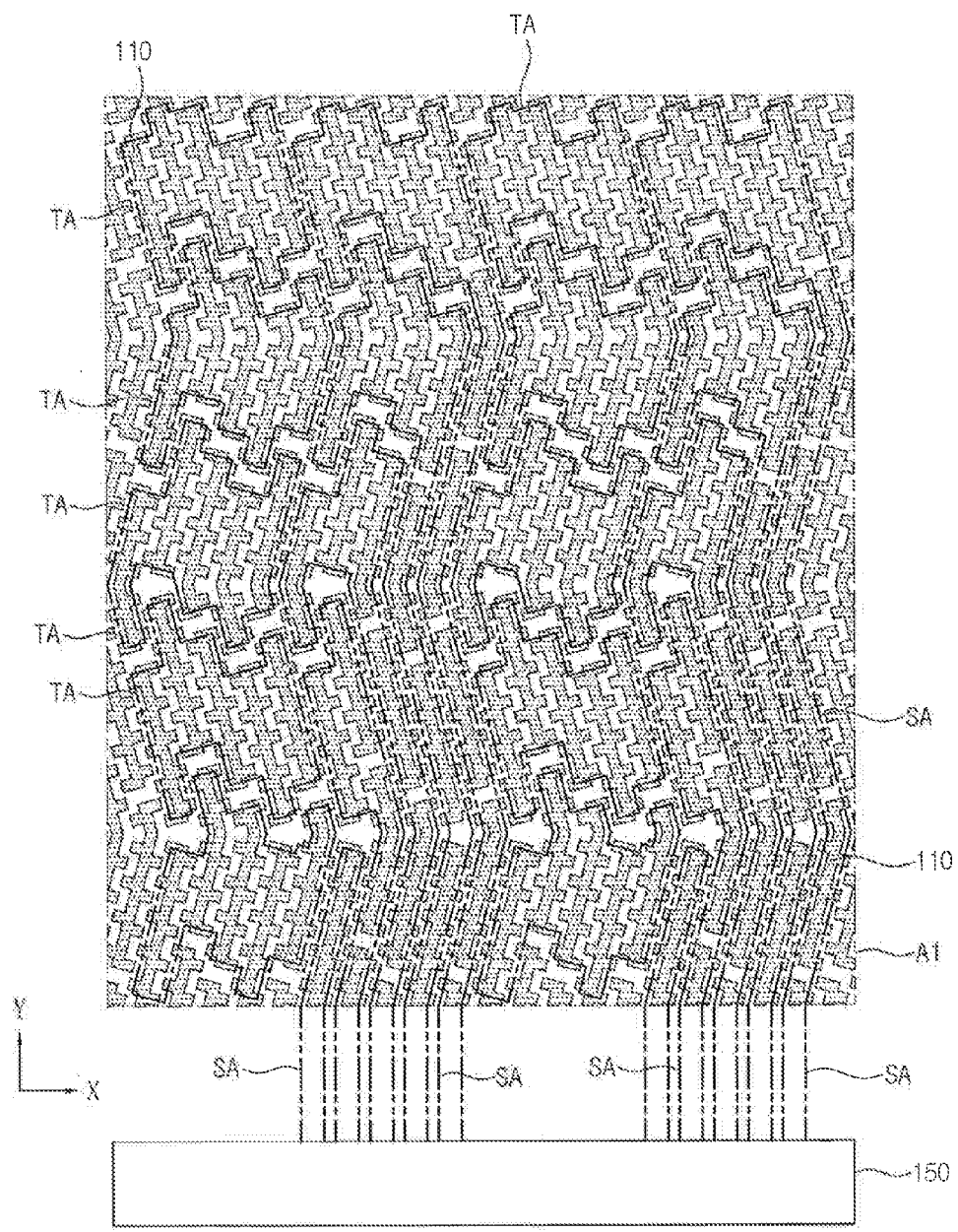
Figure 8:
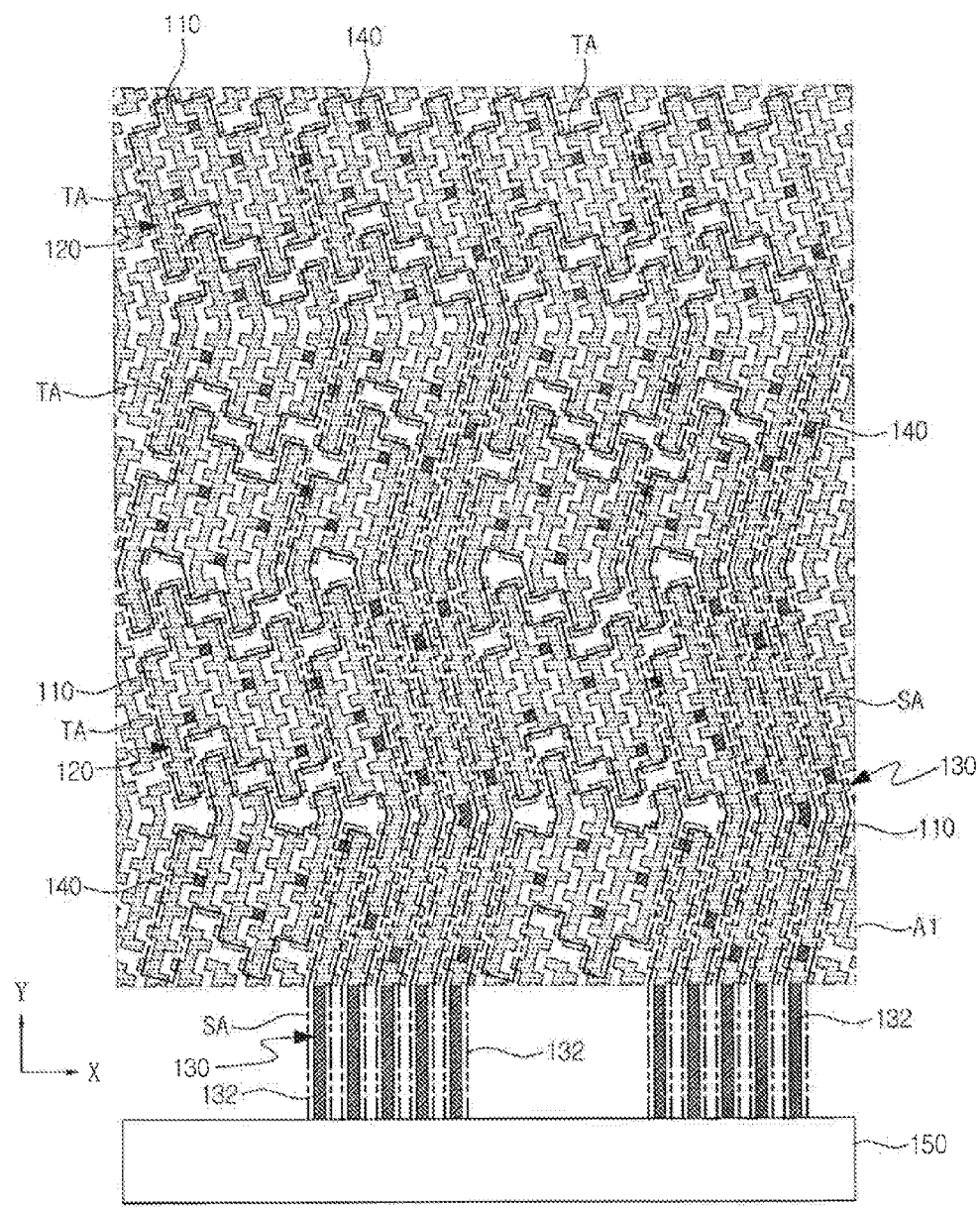

FIGS. 6 to 8 are views illustrating a process of forming a matrix switching type touch panel according to an embodiment of the present disclosure.

In a matrix switching type touch panel according to an embodiment of the present invention, touch pads 120 are disposed in a dot matrix format, the touch pads 120 spaced from one another as illustrated in FIG. 1, and a plurality of signal lines 130 are disposed in the space between the touch panels, each signal line connecting a touch pad and a touch driving circuit of an invisible area.

That is, as illustrated in FIG. 6, each of the plurality of unit electrodes 110 in the visible area A1 is arranged such that a first straight line section that is slantly disposed in a first direction with respect to a first axis (Y) and a second straight line section that is slantly disposed in a second direction symmetrical to the first straight line section based on the first axis (Y) are repeated alternately, thereby in a zigzag format along the first axis (Y).

Furthermore, in order to form a touch pad 120 and signal line 130 based on the such unit electrodes 110, as illustrated in FIG. 7, an area corresponding to each touch pad 120 of a matrix switching type touch panel is set as a touch pad area TA, and an area corresponding to each signal line 130 is set as a signal line area SA.

More specifically, a touch pad area TA is set as a boundary including a plurality of unit electrodes 110 corresponding to the touch pad, wherein since the end portions of the plurality of unit electrodes 110 are arranged such that they cross the end portions of the neighboring unit electrodes 110 in the second axis (X) direction, the upper and lower boundaries of the touch pad area TA arranged in the first axis (Y) direction are set to have irregular lines.

In addition, signal line areas SA are disposed parallel to one another in the space between a left touch pad area TA and right touch pad area TA so as to connect each touch pad area TA and the touch driving circuit 150 disposed in the invisible area A2, the signal line areas SA having different lengths according to the location of each touch pad area TA, wherein an upper end portion is determined to be connected to the corresponding touch pad area TA.

After the touch pad areas TA and signal line areas SA are determined as mentioned above, bridges 140 made of a transparent electroconductive material are disposed between the unit electrodes 110 so as to electrically connect the unit electrodes 110 disposed in each touch pad area TA and signal line area SA.

That is, as illustrated in FIGS. 8 and 5, in connecting the unit electrodes 110 disposed along the second axis (X) direction, a bridge 140 made of a transparent electrode material is disposed between a protrusion 112 formed at a longer side of a unit electrode and its neighboring unit electrode 110, so as to electrically connect the unit electrodes 110 disposed along the second axis (X) direction.

Herein, different from when a plurality of bridges 140 are disposed parallel to one another together with the protrusions 112, the plurality of bridges 140 along the second axis (X) direction are disposed alternately to one another, thereby preventing the visibility from increasing.

In addition, in connecting the unit electrodes 110 disposed along the first axis (Y) direction, bridges 140 made of transparent electrode material are disposed between the shorter sides of the unit electrodes 110 and the shorter sides of their neighboring unit electrodes 110 along the first axis (Y) direction, so as to electrically connect the upper and lower unit electrodes 110 disposed along the first axis (Y) direction.

As aforementioned, the unit electrodes 110 disposed within each touch pad area TA and signal line area SA are connected by a bridge 140 to configure a touch pad 120 and signal line 130.

In addition, each touch pad 120 and an upper end portion of its corresponding signal line 130 are connected to each other by a bridge 140, and a lower end portion of each signal line is made of the same material as the bridge 140, and then connected to the touch driving circuit 150 using a connecting line 132 disposed in the invisible area A2.

Meanwhile, in the present embodiment, for better understanding of the present disclosure, it was explained that the plurality of unit electrodes 110 are electrically connected using bridges 140 distinguishable from unit electrodes 110, and that the signal lines 130 and the touch driving circuit 150 are electrically connected using the connecting line 132, but it would be desirable to form the bridges 140 and connecting lines 132 in an integral manner with the unit electrodes 110 in the processing of patterning the unit electrodes 110.

Furthermore, in the present embodiment, it was explained that touch pads 120 and signal lines 130 are disposed in the same layer and then connected via bridges 140 to configure a single layer type touch panel, but it would also be possible to dispose the touch pads 120 on an upper layer and dispose the signal lines 130 on a lower layer, and then connect them with bridges, to configure a double layer type touch panel.

Figure 9:
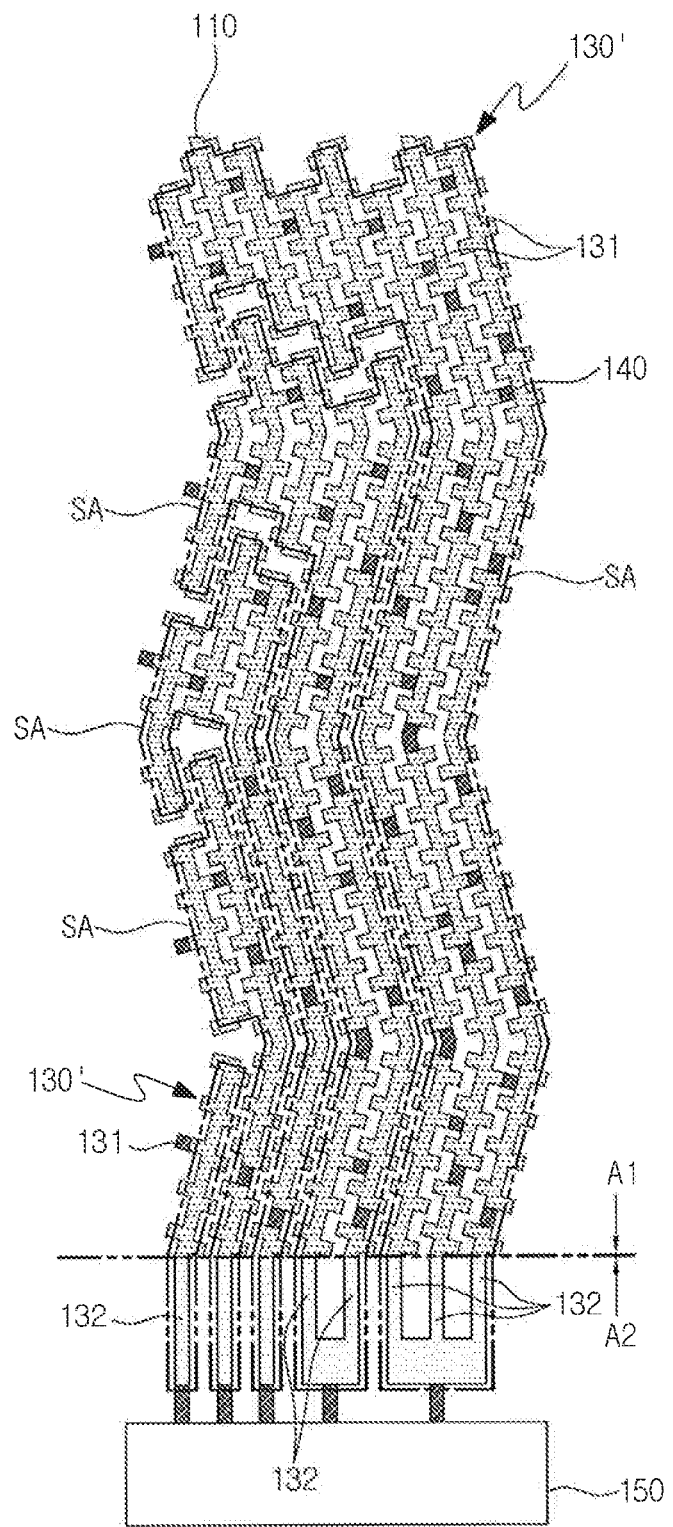
FIG. 9 is a partial exploded view of signal lines in a matrix switching type touch panel according to another embodiment of the present disclosure.

FIG. 9 is a partial exploded view of signal lines in a matrix switching type touch panel according to a second embodiment of the present disclosure.

The configurative elements of the second embodiment are the same as those in the first embodiment except for the signal line 130', and thus detailed explanation will be based on the aforementioned explanation made with reference to the first embodiment, and hereinbelow is detailed explanation on the signal line 130' of the second embodiment.

A signal line 130' of a matrix switching type touch panel according to the second embodiment of the present disclosure may be formed by electrically connecting two or more unit signal lines 131 of among a plurality of unit signal lines 131 disposed along the second axis (X) direction so as to reduce the resistance according to the distance between the touch pads 120 and the touch driving circuit 150.

Herein, a unit signal line 131 refers to one line format made by connecting a plurality of unit electrodes 110 disposed along the first axis (Y) direction by bridges 140.

More specifically, in the first embodiment illustrated in FIG. 4, regardless of the distance between a touch pad 120 and the touch driving circuit 150, all signal lines 130 comprise one unit signal line 131, and is electrically connected to the touch driving circuit 150 through one connecting line 132 connected to one unit signal line 131.

On the other hand, in the second embodiment illustrated in FIG. 9, the first, second and third touch pads 120 close to the touch driving circuit 150 are connected to the touch driving circuit 151 through one unit signal line 131 and one connecting line 132 in the same manner as in the first embodiment, but fourth touch pad that is farther from the touch driving circuit is connected to the touch driving circuit through two unit signal lines 131 and two connecting lines 132, and the fifth touch pad is connected to the touch driving circuit through three unit signal lines 131 and three connecting lines 132.

As illustrated in FIG. 9, a plurality of unit signal lines 131 aligned in a row may prevent the resistance and parasitic capacitance from increasing even when the wire length of the signal lines 130' increase, since the connecting lines 132 that connect each signal line 131 and the touch driving circuit 150 in the invisible area A2 are electrically connected to one another thereby increasing the size area of the signal lines 130'.

Especially, the aforementioned signal lines 130' connect a plurality of unit signal lines 131 in the invisible area A2, and thus even if they increase the size area of the signal lines 130', there is no increase in the width of the unit signal line 131 or change in the space therebetween, thereby preventing the signal lines 130' from being visible.

Meanwhile, it was explained in the present embodiment, that two or more unit signal lines 131 are electrically connected in the invisible area A2, but it may also be possible to configure such that two or more unit signal lines 131 are electrically connected by a plurality of bridges 140 within the visible area A1. Herein, it is desirable that the plurality of bridges 140 connecting the two or more unit signal lines 131 are disposed alternately to the neighboring bridges along the X axis direction as mentioned above.

Figure 10:
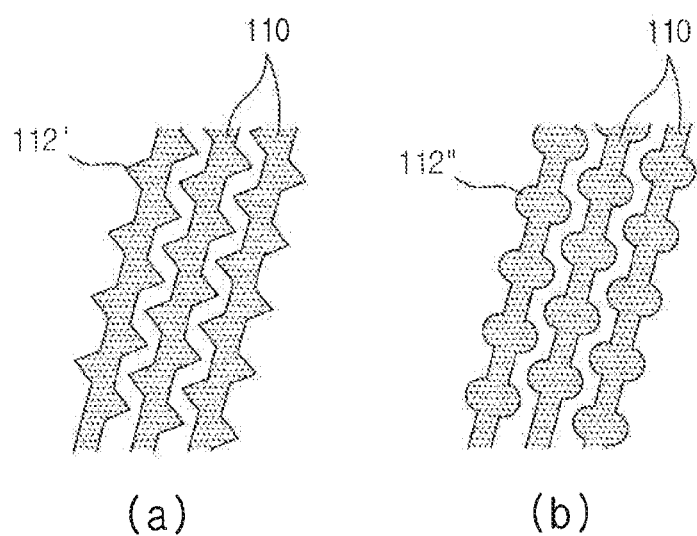
FIG. 10 is a view of a unit electrode in a matrix switching type touch panel according to a modified embodiment of the present disclosure.

FIG. 10 is a view of a unit electrode in a matrix switching type touch panel according to a modified embodiment of the present disclosure.

According to the modified embodiment of a unit electrode 110 of the present disclosure, protrusions formed at each side of a unit electrode 110 may be triangular as in (a) of FIG. 10 or semicircular as in (b) of FIG. 9.

Of course, such triangular or semicircular protrusions 112 should be disposed alternately to the protrusions 112 of the neighboring unit electrode 110 regarding the direction that crosses the signal lines 130 as in the first embodiment.

A number of examples have been described above. Nevertheless, it will be understood that various modifications may be made. For example, suitable results may be achieved if the described techniques are performed in a different order and/or if components in a described system, architecture, device, or circuit are combined in a different matter and/or replaced or supplemented by other components or their equivalents. Accordingly, other implementations are within the scope of the following claims.

DESCRIPTION OF REFERENCE NUMERALS

110: UNIT ELECTRODE
112: PROTRUSION
120: TOUCH PAD
130: SIGNAL LINE
131: UNIT SIGNAL LINE
132: CONNECTING LINE
140: BRIDGE
150: TOUCH DRIVING CIRCUIT
TA: TOUCH PAD AREA
SA: SIGNAL LINE AREA
A1: VISIBLE AREA
A2: INVISIBLE AREA

What is claimed is:

1. A matrix switching type touch panel comprising a plurality of touch pads disposed in a visible area on a substrate in a dot matrix format, the touch pads spaced from one another and not electrically connected to each other, and a plurality of signal lines disposed in a space between the touch pads, each signal line connecting each touch pad and a touch driving circuit of an invisible area, wherein the matrix switching type touch panel comprises:
    touch pad areas each determined in an area corresponding to each touch pad, each touch pad area comprising a first plurality of unit electrodes comprising a transparent electroconductive material and disposed within a visible area on the substrate;
    signal line areas each determined in an area corresponding to each signal line each signal line area comprising a second plurality of unit electrodes comprising a transparent electroconductive material and disposed within a visible area on the substrate; and
    a first plurality of bridges electrically connecting the first plurality of unit electrodes disposed in each touch pad area and a second plurality of bridges electrically connecting the second plurality of electrodes disposed in each signal line area, wherein the first plurality of unit electrodes and the second plurality of unit electrodes are arranged in a zigzag format with respect to a first axis parallel to the signal lines, and wherein the first plurality of unit electrodes disposed in each of the touch pad areas are connected by the first plurality of bridges to define each of the touch pads and the second plurality of unit electrodes disposed in each of the signal line areas are connected by the second plurality of bridges to define each of the signal lines.

2. The matrix switching type touch panel according to claim 1, wherein each of the first plurality of unit electrodes and the second plurality of unit electrodes is arranged such that a first straight line section that is slantly disposed in a first direction with respect to the first axis and a second straight line section that is slantly disposed in a second direction symmetrical to the first straight line section based on the first axis are alternately repeated.

3. The matrix switching type touch panel according to claim 2, wherein the first direction and second direction are set to be between 10 to 20 degrees to both sides with respect to the first axis.

4. The matrix switching type touch panel according to claim 1, wherein the first plurality of bridges are formed on a same layer as the first plurality of unit electrodes and the second plurality of bridges are formed on the same layer as the second plurality of unit electrodes.

5. The matrix switching type touch panel according to claim 4, wherein the first plurality of unit electrodes and the second plurality of unit electrodes are each provided with a plurality of protrusions at both sides, and the plurality of protrusions are disposed alternately to the protrusions of neighboring unit electrodes.

6. The matrix switching type touch panel according to claim 5, wherein the first plurality of bridges and the second plurality of bridges are extended from at least one protrusion of among the plurality of protrusions provided at a pair of neighboring unit electrodes.

7. The matrix switching type touch panel according to claim 6, wherein the first plurality of bridges are disposed alternately to neighboring bridges along a direction crossing the first axis and the second plurality of bridges are disposed alternately to neighboring bridges along a direction crossing the first axis.

8. The matrix switching type touch panel according to claim 1, wherein end portions of the second plurality of unit electrodes are disposed alternately to end portions of neighboring unit electrodes along a direction crossing the first axis and end portions of the second plurality of bridges are disposed alternately to end portions of neighboring bridges along a direction crossing the first axis.

9. The matrix switching type touch panel according to claim 1, wherein the signal lines comprise two or more unit signal lines aligned in rows so as to reduce the resistance along the wire length between the touch panels and touch driving circuit.

10. The matrix switching type touch panel according to claim 9, wherein the two or more unit signal lines are electrically connected to each other as the connecting lines connecting each unit signal line with the touch driving circuit within the invisible area are connected to each other.

11. The matrix switching type touch panel according to claim 9, wherein the two or more unit signal lines are electrically connected to each other by a third plurality of bridges within the visible area.

* * * * *